(12) United States Patent
Sorenson (10) Patent No.: US 6,324,548 B1
(45) Date of Patent: Nov. 27, 2001

(54) DATABASE BACKUP AND RECOVERY USING SEPARATE HISTORY FILES FOR DATABASE BACKUP AND AUDIT BACKUP

(75) Inventor: Ellen L. Sorenson, Mounds, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/359,088

(22) Filed: Jul. 22, 1999

(51) Int. Cl.[7] .................................................. G06F 17/30
(52) U.S. Cl. ............................................. 707/204; 707/203
(58) Field of Search .................................... 707/204, 203, 707/202, 201, 3, 4; 714/4, 19, 162, 6

(56) References Cited

U.S. PATENT DOCUMENTS

| | | | |
|---|---|---|---|
| 5,381,545 | * | 1/1995 | Baker et al. ............................ 714/19 |
| 5,404,508 | * | 4/1995 | Konard et al. ........................ 707/202 |
| 5,675,802 | * | 10/1997 | Allen et al. ............................. 717/3 |
| 5,740,433 | * | 4/1998 | Carr et al. ............................. 707/202 |
| 5,764,877 | * | 6/1998 | Lomet et al. ............................. 714/6 |
| 5,794,252 | * | 8/1998 | Bailey et al. .......................... 707/202 |
| 5,799,323 | * | 8/1998 | Mosher, Jr. et al. .................. 707/202 |
| 5,835,915 | * | 11/1998 | Carr et al. ............................. 707/202 |
| 5,884,328 | * | 3/1999 | Mosher, Jr. ............................ 707/202 |
| 6,079,000 | * | 6/2000 | Cooper et al. ........................ 711/162 |
| 6,163,856 | * | 12/2000 | Dion et al. ................................ 714/4 |

* cited by examiner

*Primary Examiner*—Sanjiv Shah
(74) *Attorney, Agent, or Firm*—Charles A. Johnson; Mark T. Starr; Crawford, PLLC (57) ABSTRACT

A database backup process and system are disclosed in various embodiments. A backup copy of the database is created and a timestamp indicating the time at which the backup copy was created is written to a first history file. A plurality of backup copies of a database audit file are concurrently created, and device identifiers referencing respective devices on which the backup copies of the audit file were created and timestamps indicating respective ranges of audit records in the backup copies of the audit file are written to a plurality of move-history files respectively associated with the plurality of backup copies of the audit file.

18 Claims, 5 Drawing Sheets

DATABASE BACKUP AND RECOVERY USING SEPARATE HISTORY FILES FOR DATABASE BACKUP AND AUDIT BACKUP

FIELD OF THE INVENTION

The present invention generally relates to database management systems, and more particularly to database backup and recovery.

BACKGROUND OF THE INVENTION

Databases have played a critical role in business areas such as banking and airline reservations for many years. These two lines of business illustrate how critical availability of a database can be. If a bank cannot process customer transactions (deposits, payments, transfers, etc.) because of a computer system failure, a customer may be unable to accomplish its business. Likewise, if an airline is unable to book reservations, customers may be lost and its planes may fly empty. Therefore, database availability is critical.

There are generally two components to backing-up a transaction oriented database. One component is creating a backup copy of the files that comprise the database, and the second component is tracking updates made to the database. Thus, for a full recovery of a database, the most recent backup copies of the database files are reloaded, and the database updates made subsequent to the backup of the database files must be applied to the reloaded files. The process of backing-up database files is sometimes referred to as "dumping" the database, and the process of logging status information and database updates is sometimes referred to as "auditing." The database backup files are "database dumps" and the file to which update information is logged is the "audit file."

In one prior system, for example, the Integrated Recovery Utility from Unisys Corporation, information related to the database dumps and audit file backups was maintained in a history file. The history file included the tape identifiers of the tapes on which the dumps and backups were stored, the times of the dumps, and the ranges of audit records stored on respective tapes.

The history file freed the database administrator from having to manually track the tapes and times associated with the database dumps and audit backups. However, simultaneous database dumping and audit archiving were not permitted in order to prevent corruption to the history file. Furthermore, redundant copies of archived audit information required a separate administrator-maintained mechanism (in addition to the history file) for tracking the locations of additional audit archives.

A system and method that addresses the aforementioned problems, as well as other related problems, is therefore desirable.

SUMMARY OF THE INVENTION

In various embodiments, a system and method for database backup and recovery are provided. In one embodiment, a computer-implemented process is provided. The process includes creating a backup copy of the database and writing to a first history file a timestamp indicating the time at which the backup copy was created. A plurality of backup copies of a database audit file are concurrently created, and device identifiers referencing respective devices on which the backup copies of the audit file were created and timestamps indicating respective ranges of audit records in the backup copies of the audit file are written to a plurality of move-history files respectively associated with the plurality of backup copies of the audit file.

A system for database backup and recovery is provided in another embodiment. The system comprises an audit processor coupled to an audit file, and a recovery processor coupled to the database and to the audit file. The audit processor is configured and arranged to write audit records to the audit file. The recovery processor is configured and arranged to create a backup copy of the database and write to a first history file a timestamp indicating the time at which the backup copy was created. The recovery processor is further configured and arranged to concurrently create a plurality of backup copies of a database audit file and write a plurality of move-history files respectively associated with the plurality of backup copies of the audit file, device identifiers referencing respective devices on which the backup copies of the audit file were created and timestamps indicating respective ranges of audit records in the backup copies of the audit file.

In another embodiment, an apparatus is provided for database backup. The apparatus comprises means for creating a backup copy of the database; means for writing to a first history file a timestamp indicating the time at which the backup copy was created; means for concurrently creating a plurality of backup copies of a database audit file; and means for writing to a plurality of move-history files respectively associated with the plurality of backup copies of the audit file, device identifiers referencing respective devices on which the backup copies of the audit file were created and timestamps indicating respective ranges of audit records in the backup copies of the audit file.

In accordance with an example embodiment of the invention, there is provided a computer program product that is configured to be operable to create a backup copy of the database and write to a first history file a timestamp indicating the time at which the backup copy was created, concurrently create a plurality of backup copies of a database audit file, and write to a plurality of move-history files respectively associated with the plurality of backup copies of the audit file, device identifiers referencing respective devices on which the backup copies of the audit file were created and timestamps indicating respective ranges of audit records in the backup copies of the audit file.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

Figure 1A:
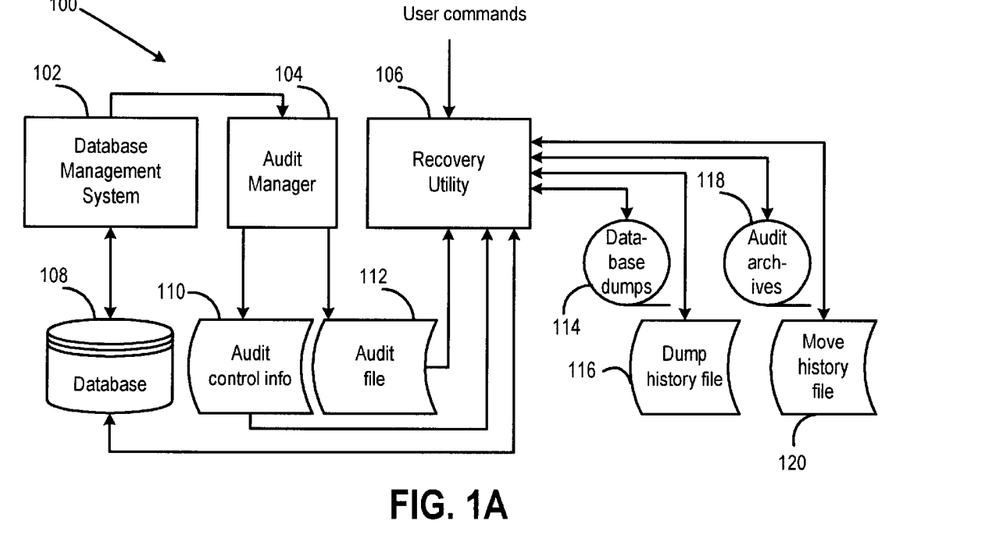
FIG. 1A is a functional block diagram of a system for managing backing-up and recovering a database, in accordance with an example embodiment of the invention.

FIG. 1A is a functional block diagram of a system for managing backing-up and recovering a database, in accordance with an example embodiment of the invention. System 100 includes database management system (DBMS) 102, audit manager 104, recovery utility 106, database 108, audit control information 110, audit file 112, database dumps 114, dump history file 116, audit archives 118, and move history file 120.

DBMS 102 is a conventional database management system, such as the Relational Data Management System from Unisys. User and administrator input/output for the files that comprise database 108 are controlled by DBMS 102.

Audit Manager 104 is a conventional software component that is interfaced with DBMS 102 and audits operations performed by DBMS 102 on database 108. The operations are logged to audit file 112, and various status information pertaining to information in audit file 112 is stored in audit control information file 110.

Recovery utility 106 is based on conventional software that makes backup copies of database 108 and audit file 112. In the example embodiment, separate history files 116 and 120 are maintained by recovery utility 106 in describing backup activities for database dumps 114 and audit archives 118, respectively.

In response to a user-input dump command, recovery utility 106 copies to tape 114 selected files of database 108. Recorded in dump history file 116 are the names of the files, the tape identifier associated with the tape to which the file was copied, and a timestamp indicating the time at which the copy was made.

In response to a user-input move command, recovery utility 106 copies a selected portion of audit file 112 to audit archives tape 118, and a corresponding entry in move history file 120 is updated. Move history file 120 includes the tape identifier of the tape to which the audit file information was copied, a begin timestamp, and an end timestamp. The begin timestamp indicates the timestamp of the first audit record on the associated tape, and the end timestamp indicates the timestamp of the last audit record on the tape.

A user-input reload command causes recovery utility 106 to copy selected database files from database dumps 114 back to online database 108. The database files retrieved from tape will generally be those having the most recent timestamps, for example, as indicated in dump history file 116.

Recovery utility 106, in response to a recover command, reads audit information from audit archives 118, based on the dump history timestamps of the reloaded database files, and applies the audits to the reloaded files. Move history file 120 is used by recovery utility 106 to determine which tape has the desired audit information.

Figure 1B:
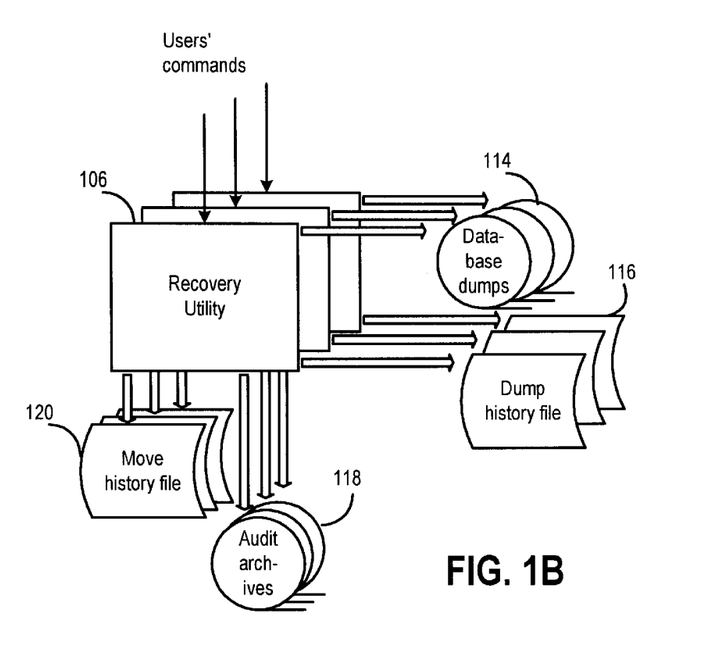
FIG. 1B is a flow diagram of the data that moves from multiple instances of a recovery utility to multiple database dump tapes 114, multiple dump history files 116, multiple audit archives 118, and multiple move history files.

FIG. 1B is a flow diagram of the data that moves from multiple instances of recovery utility 106 to multiple database dump tapes 114, multiple dump history files 116, multiple audit archives 118, and multiple move history files 120. In accordance with an example embodiment, separation of information in move history file 120 from information in dump history file 116 permits multiple concurrent backups of information in audit file 112. Multiple backups provide additional protection against disasters, and concurrency allows multiple move requests to be processed at once. It will be appreciated that in an alternative embodiment, a single instance of recovery utility 106 could process multiple user commands to produce multiple audit archive tapes 118.

Figure 2:
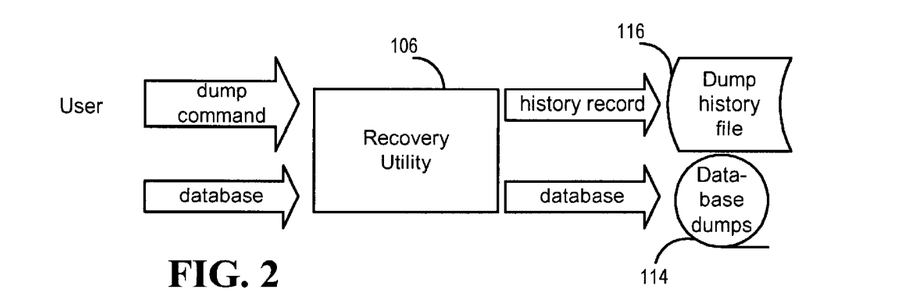
FIG. 2 is a data flow diagram illustrating operation of a dump command.

FIG. 2 is a data flow diagram illustrating operation of a dump command. A user inputs a dump command to recovery utility 106, which in response reads database files and writes the files to tape 114. For each of the files written to tape, a dump history record is written to dump history file 116.

Figure 3:
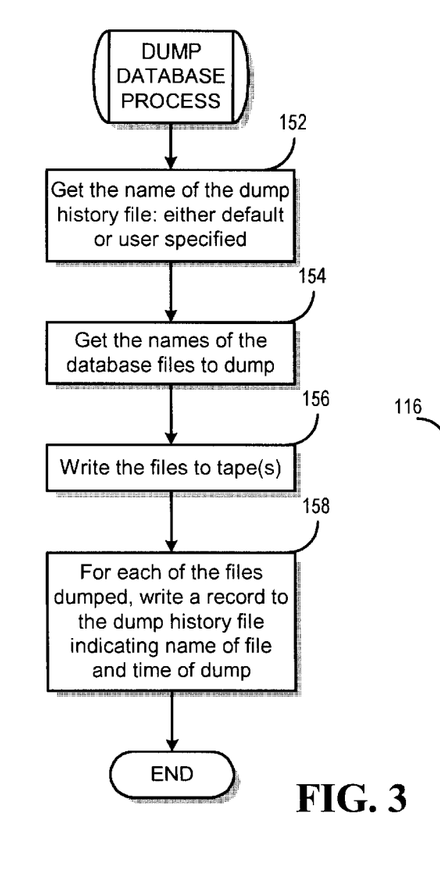
FIG. 3 is a flowchart of an example process for dumping a database.

FIG. 3 is a flowchart of an example process for dumping a database. The process generally entails copying certain database files to tape and updating the corresponding entries in dump history file 116. The process for dumping database files to tape and updating the dump history file is done iteratively. That is, a file is written to tape, and then the dump history file is updated with the appropriate timestamp. The next file is then written to tape and the dump history file is updated. The steps are repeated until all the database files have been copied to tape.

At step 152, the process obtains the name of the dump history file. Generally, a default dump history file can be specified in a configuration file used by recovery utility 106. Otherwise, a user can optionally specify an alternate dump history file. Similarly at step 154, the user must specify the names of the database files to dump. At step 156, each of the files is written to tape, one following another. At step 158, respective records are written to dump history file 116 for each of the dumped database files.

Figure 4:
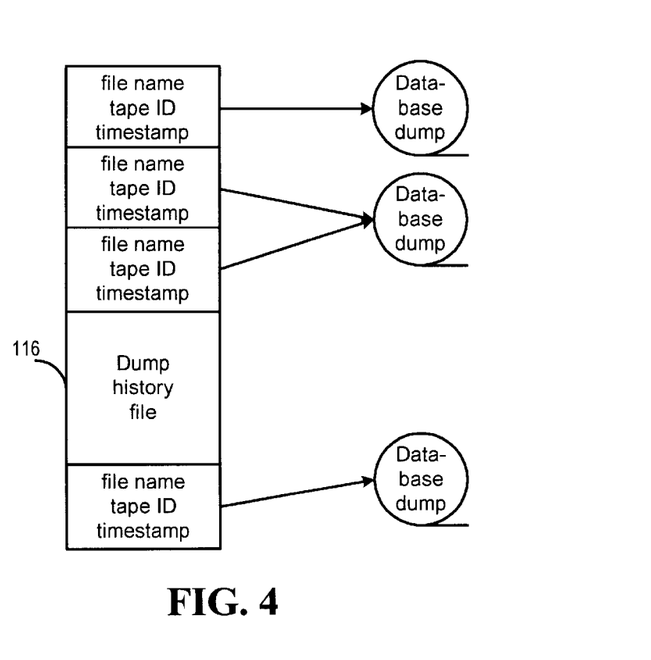
FIG. 4 shows an example dump history file.

FIG. 4 shows an example dump history file 116. Each time a database file is dumped to tape, a new record is written to dump history file 116. Each record indicates the name of the file dumped, the tape identifier of the tape on which the file was dumped, and a timestamp indicated the time at which the file was dumped. It will be appreciated that some of the records may reference the same tape if the associated dump files reside on the same tape.

Locking of dump history file 116 is performed at the block level. Thus, multiple dump activities may concurrently write to a particular dump history file. "Block" as used herein references a physical unit of storage managed by the OS-2200 operating system from UNISYS.

Figure 5:
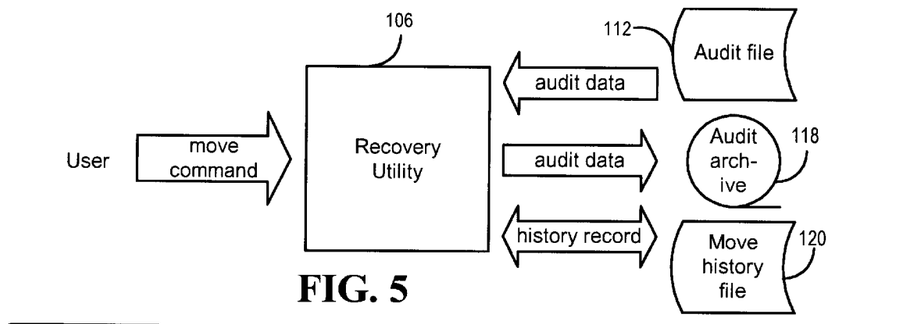
FIG. 5 is a flow diagram showing the flow of data to and from the recovery utility in response to a move command.

FIG. 5 is a flow diagram showing the flow of data to and from recovery utility 106 in response to a move command. The move command is used to backup information in audit file 112. Recovery utility 106 responds to a move command input from a user by reading a record from the move history file to determine the last archived audit record. Audit data is read from audit file 112 beginning with the first record following the last archived record, and the audit data is written to audit archive 118. A history record is written to the move history file 120. Each record in the move history file includes the tape identifier of the tape on which archived audit data is stored and begin and end timestamps. The begin timestamp is the timestamp of the first audit record on the associated tape, and the end timestamp is the timestamp of the last audit record on the tape. The timestamps are used in the recovery process to locate the audit archive tape 118 having the necessary audit data.

Figure 6:
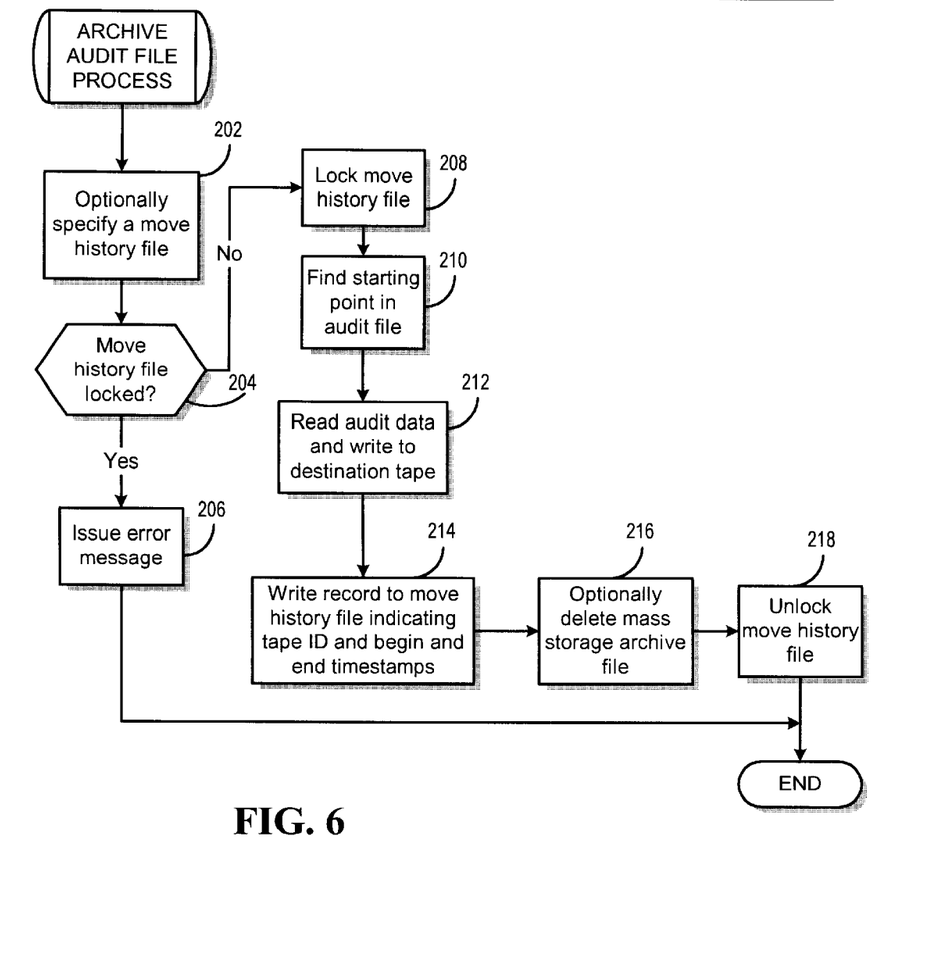
FIG. 6 is a flowchart of the processing performed in archiving audit file data.

FIG. 6 is a flowchart of the processing performed in archiving audit file data. At step 202, a user may optionally select a move history file. If the user does not provide the name of a move history file, recovery utility 106 uses a default move history file, which can be specified in a configuration file, for example. With possible multiple move history files, redundant backups can be made of the audit file 112 data, thereby providing further protection against data loss.

If the move history file is locked, decision step 204 directs control to step 206 where an error message is issued to the user and the process ends. Otherwise, control is directed to step 208 where the move history file is locked. The move history file is locked to prevent corruption that may result from another user issuing a move command and using the same move history file.

At step 210, the record in audit file 112 at which to begin the backup is located. The record in audit file 112 at which to begin backing up data is the record immediately following the last record backed-up in the previous move command. Audit records are read from that record to the end of the file and written to the destination audit archive tape 118.

The move history file is updated at step 214. The update information includes the tape identifier of the tape to which the audit records were written and begin and end timestamps. At step 216, the mass storage audit file is optionally deleted, for example at the option of the database administrator, and the move history file is unlocked at step 218.

Figures 7, 8:
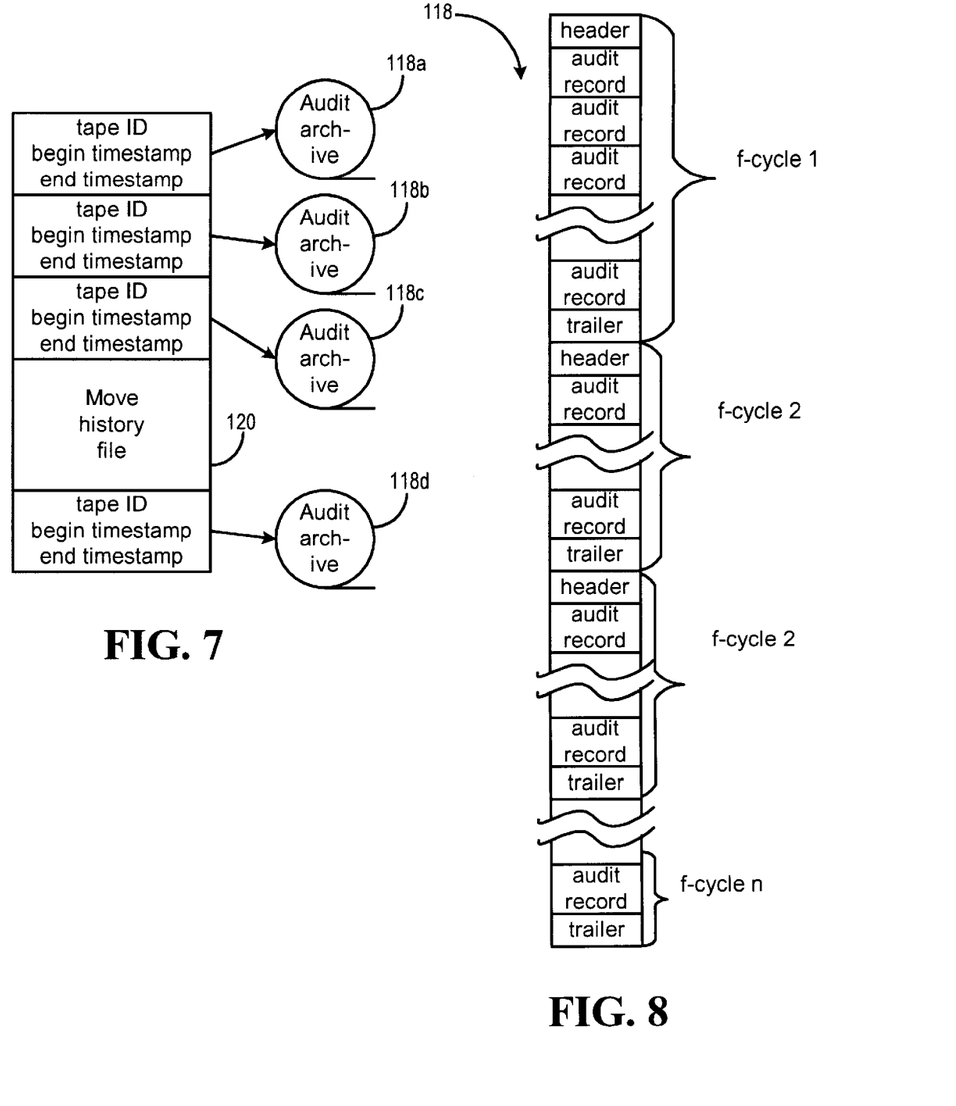
FIG. 7 illustrates an example move history file.
FIG. 8 illustrates the data contained on an audit archive tape.

FIG. 7 illustrates an example move history file 120. Each record includes, for example, the tape identifier and begin and end timestamps. The tape identifier references a particular audit archive tape 118a–n. In an example embodiment, recovery utility 106 writes to a new archive tape with each move command. Thus, each move command results in a new record being written to move history file 120. The begin timestamp references the timestamp of the first audit record on the associated audit archive tape, and the end timestamp references the timestamp of the last audit record on the associated audit archive tape.

FIG. 8 illustrates the data contained on an audit archive tape 118. An audit archive tape contains one or more "f-cycles" of audit file 112 in accordance with an example embodiment. Audit manager 104 creates a new f-cycle when, for example, the database administrator disables and then enables auditing of database operations, or a maximum size is reached. Each f-cycle is a type of file, including a header, audit records, and a trailer.

The begin timestamp is the timestamp of the first audit record in the first f-cycle, and the end timestamp is the timestamp on the last audit record in the last f-cycle on the audit archive tape 118. A move command causes one or more f-cycles of audit file 112 to be written to an audit archive tape.

Returning now step 216 of FIG. 6, the move history file is unlocked after backup of the audit data is complete. This ends the process of archiving the audit file.

Figure 9:
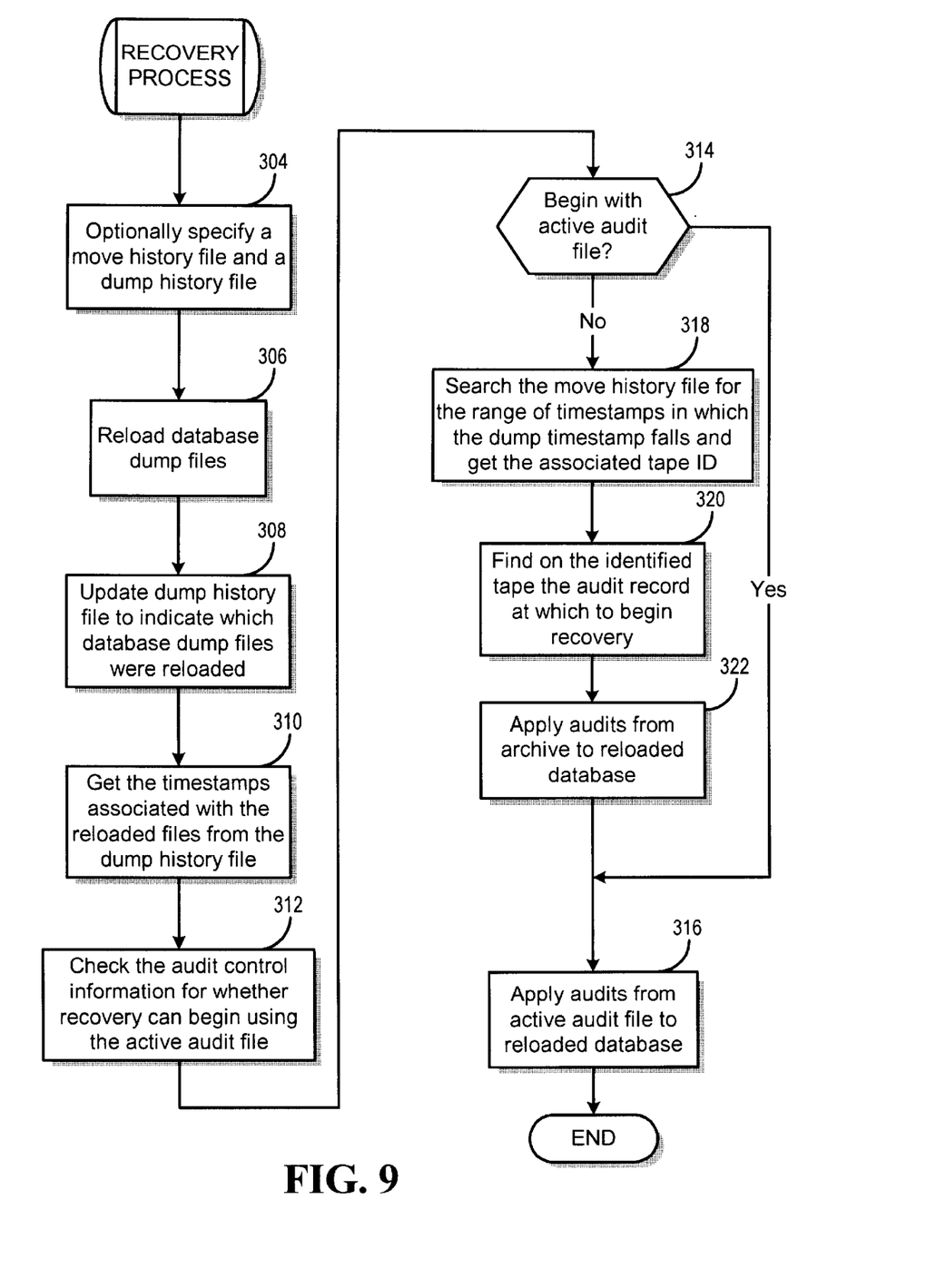
FIG. 9 is a flowchart of an example process for recovering a database.

FIG. 9 is a flowchart of an example process for recovering a database. In the example embodiment, database recovery proceeds in two phases: a reload phase and an audit recovery phase. Each phase is initiated by a database administrator, for example. Steps 306 and 308 are directed to the process of reloading database dump files, and the remaining steps are directed to recovering the database using the archived audit files.

Depending on the level of recovery required, the database files may or may not need to be reloaded. If reloading the database files is required, then the administrator specifies which files are to be reloaded.

A particular move history file 120 can be optionally specified at step 304. If no move history file is specified, a default is used.

At step 306, the database dump files are reloaded from tape 114. The tape identifiers in the dump history file are used to identify the tapes from which the database files are restored. Dump history file 116 is updated at step 308 to indicate which dump files were reloaded. For example, a reload flag is set to indicate (to the audit recovery process) which files were reloaded. The audit recovery process clears the flags when audit recovery is complete.

Step 310 generally begins phase of database recovery involving applying audit information to the recovered database files. Dump history file 116 is scanned at step 310 to identify which database files were reloaded in order to obtain the timestamps associated with the reloaded files. Recall that a timestamp associated with a database dump file indicates the time at which the file was backed-up to tape.

At step 312, audit control information 110 is checked to determine whether recovery can begin using the active audit file 112, or whether recovery must begin with an archived audit file. Audit control information 110 indicates the earliest timestamp of the audit records in audit file 112. If the earliest audit record predates the earliest timestamp of the reloaded database files (in other words, the active audit file contains audit records that predate the database dump and there is no need to reference archived audit records), then the active audit file 112 can be used. Otherwise, recovery must begin with an archived audit file.

If recovery can begin with the active audit file 112, decision step 314 directs control to step 316, where audit records in the active audit file are applied to the reloaded database files. Otherwise, control is directed to step 318 where move history file is searched for the record having the range of timestamps that includes the earliest timestamp ("dump timestamp") obtained at step 310. The associated tape identifier is obtained, and at step 320 the tape is searched for the first audit record having a timestamp later than the dump timestamp. From that audit record forward, the audits are applied to the reloaded database at step 322. Processing then continues at step 316 to apply the remaining audit records from the active audit file to the reloaded database.

Accordingly, the present invention provides, among other aspects, a system and method for backing-up and recovering a database. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

I claim:

1. A computer-implemented database backup process, comprising:

creating a backup copy of the database;

writing to a first history file a timestamp indicating the time at which the backup copy was created;

concurrently creating a plurality of backup copies of a database audit file;

writing to a plurality of move-history files respectively associated with the plurality of backup copies of the audit file, device identifiers referencing respective devices on which the backup copies of the audit file were created and timestamps indicating respective ranges of audit records in the backup copies of the audit file, receiving a request to create a backup copy of the audit file;

selecting one of the plurality of move-history files a selected move-history file;

if the selected move-history file is locked, preventing creation of the backup copy of the audit file;

if the selected move-history file is not locked,
locking the selected move-history file prior to creation of the backup copy of the audit file; and
unlocking the move-history file after creation of the back copy of the audit file.

2. The process of claim 1, further comprising:

receiving a request to create a backup copy of the audit file;

selecting one of the plurality of move-history file as a selected move-history file;

if the selected move-history file is locked, preventing creation of the backup copy of the audit file;

if the selected move-history file is not locked,
locking the selected move-history file prior to creation of the backup copy of the audit file; and
unlocking the move-history file after creation of the backup copy of the audit file.

3. The process of claim 1, further comprising creating the backup copy of the database in response to a user-entered command.

4. The process of claim 1, further comprising creating the plurality of copies of the audit file in response to a plurality of user-entered commands.

5. The process of claim 1, further comprising:

creating the backup copy of the database on a storage device;

writing to the first history file a device identifier referencing the device on which the backup copy of the database was created.

6. The process of claim 5, wherein the database is comprised of a plurality of files, the process further comprising:

creating backup copies of the plurality of files; and writing to the first history file records containing respective file names of the plurality of files, respective timestamps, and respective device identifiers.

7. The process of claim 1, wherein the storage device is a magnetic tape.

8. A computer-implemented database backup and recovery process, comprising:

creating a backup copy of the database;

writing to a first history file a dump timestamp indicating the time at which the backup copy was created;

concurrently creating a plurality of backup copies of a database audit file;

writing to a plurality of move-history files respectively associated with the plurality of backup copies of the audit file, device identifiers referencing respective devices on which the backup copies of the audit file were created and timestamps indicating respective ranges of audit records on the storage devices; and recovering the database using the backup copy of the database, the first history file, a selected one of the move-history files, and a selected backup copy of the audit file;

receiving a request to create a backup copy of the audit file;

selecting one of the plurality of move-history files a selected move-history file;

if the selected move-history file is locked, preventing creation of the backup copy of the audit file;

if the selected move-history file is not locked,
locking the selected move-history file prior to creation of the backup copy of the audit file; and
unlocking the move-history file after creation of the back copy of the audit file.

9. The process of claim 8, further comprising:

receiving a request to create a backup copy of the audit file;

selecting one of the plurality of move-history file as a selected move-history file;

if the selected move-history file is locked, preventing creation of the backup copy of the audit file;

if the selected move-history file is not locked,
locking the selected move-history file prior to creation of the backup copy of the audit file; and
unlocking the move-history file after creation of the backup copy of the audit file.

10. The process of claim 8, further comprising creating the backup copy of the database in response to a user-entered command.

11. The process of claim 8, further comprising creating the plurality of copies of the audit file in response to a plurality of user-entered commands.

12. The process of claim 8, further comprising:

creating the backup copy of the database on a storage device;

writing to the first history file a device identifier referencing the device on which the backup copy of the database was created.

13. The process of claim 12, wherein the database is comprised of a plurality of files, the process further comprising:

creating backup copies of the plurality of files; and writing to the first history file records containing respective file names of the plurality of files, respective timestamps, and respective device identifiers.

14. The process of claim 8, wherein the storage device is a magnetic tape.

15. The process of claim 8, wherein, for additional storage devices on which additional backup copies of the audit file are created in association with a selected move-history file, writing to the move-history file device identifiers associated with the additional storage devices and timestamps indicating respective ranges of audit records on the additional storage devices.

16. The process of claim 15, further comprising:

in recovering the database using a selected move-history file, searching a move-history file for a timestamp range including the dump timestamp associated with the reloaded database;

searching the storage device referenced by the device identifier associated with the timestamp range that includes the dump timestamp for a first audit record having a timestamp later than the dump timestamp; and recovering the database beginning with the first audit record.

17. A system for database backup comprising:

an audit processor configured and arranged to write audit records to an audit file;

a recovery processor coupled to the database and to audit file, the recovery utility and configured and arranged to create a backup copy of the database and write to a first history file a timestamp indicating the time at which the backup copy was created, the recovery processor further configured and arranged to concurrently create a plurality of backup copies of a database audit file and write a plurality of move-history files respectively associated with the plurality of the backup copies of the audit file, device identifiers referencing respective devices on which the backup copies of the audit file were created and timestamps indicating respective ranges of audit records in the backup copies of the audit file, and further arranged to prevent creation of a backup copy of the audit file if the selected move-history file is locked or creating backup copy if the selected move-history file is unlocked.

18. An apparatus for database backup comprising:

means for creating a backup copy of the database;

means for writing to a first history file a timestamp indicating the time at which the backup copy was created;

means for concurrently creating a plurality of backup copies of a database audit file;

means for writing to a plurality of move-history files respectively associated with the plurality of backup copies of the audit file, device identifiers referencing respective devices on which the backup copies of the audit file were created and timestamps indicating respective ranges of audit records in the backup copies of the audit file;

means for selecting one of said plurality of move-history files; and means for locking and unlocking a selected one of said move-history files associated with creation of a backup copy of an associated audit file.

* * * * *